United States Patent
Barbarich et al.

(10) Patent No.: US 8,703,329 B2
(45) Date of Patent: Apr. 22, 2014

(54) REDOX SHUTTLE FOR HIGH VOLTAGE LITHIUM BATTERY

(75) Inventors: Thomas Barbarich, Fishers, IN (US); Mary Patterson, Carmel, IN (US)

(73) Assignee: Enerdel, Inc., Greenfield, IN (US)

( * ) Notice: Subject to any disclaimer, the term of this patent is extended or adjusted under 35 U.S.C. 154(b) by 103 days.

(21) Appl. No.: 13/430,414

(22) Filed: Mar. 26, 2012

(65) Prior Publication Data

US 2012/0244446 A1    Sep. 27, 2012

Related U.S. Application Data

(60) Provisional application No. 61/467,687, filed on Mar. 25, 2011.

(51) Int. Cl.
*H01M 10/0567* (2010.01)
*H01M 10/0569* (2010.01)

(52) U.S. Cl.
USPC ............ 429/188; 429/325; 429/326; 429/338

(58) Field of Classification Search
USPC .......... 252/62.2; 429/188, 325, 326, 336–338
See application file for complete search history.

(56) References Cited

U.S. PATENT DOCUMENTS

| | | | |
|---|---|---|---|
| 4,201,839 A | 5/1980 | Johnson et al. | |
| 5,731,470 A | 3/1998 | Michl et al. | |
| 5,763,119 A | 6/1998 | Adachi | |
| 6,130,357 A | 10/2000 | Strauss et al. | |
| 6,534,220 B2 | 3/2003 | Garbe | |
| 7,311,993 B2 | 12/2007 | Ivanov et al. | |
| 7,348,103 B2 | 3/2008 | Ivanov et al. | |
| 7,419,623 B2 | 9/2008 | Ivanov et al. | |
| 7,591,964 B2 | 9/2009 | Ivanov et al. | |
| 7,785,740 B2 | 8/2010 | Amine et al. | |
| 2005/0227143 A1 | 10/2005 | Amine et al. | |
| 2006/0199080 A1 | 9/2006 | Amine et al. | |
| 2007/0054186 A1 | 3/2007 | Costello et al. | |
| 2007/0072085 A1 | 3/2007 | Chen et al. | |
| 2010/0209780 A1 | 8/2010 | Muldoon et al. | |
| 2011/0294003 A1 | 12/2011 | Zhang et al. | |

OTHER PUBLICATIONS

King et al. "Alkylaed carborane anions and radicals", Chemical Innovation, vol. 31, No. 12, pp. 23-31 (Dec. 2001).*
Benjamin T. King et al., Dodecamethylcarba-*closo*-dodecaborate($^-$) Anion, $CB_{11}Me_{12}$-, *J. Am. Chem. Soc.* 1996, 118, 3313-3314.
Tomás Jelínek et al., New Weakly Coordinating Anions: Derivatizafion of the Carborane Anion $CB_{11}Me_{12}$-, *Inorg. Chem.* 1993, 32, 1982-1990 (Abstract and First Page).
Tomás Jelínek et al., Chemistry of compounds with the 1-carba-*closo*-dodecaborane (12) framework, *Collect. Czech. Chem. Commun.* 1986, 51, 819-829 (Abstract).

(Continued)

*Primary Examiner* — Gregg Cantelmo
(74) *Attorney, Agent, or Firm* — Faegre Baker Daniels LLP

(57) ABSTRACT

A redox shuttle is provided to prevent overcharge of batteries and/or shuttle current in batteries including high voltage batteries, such as high voltage lithium ion (Li-ion) batteries. An exemplary redox shuttle includes a methylated closo-monocarborate anion.

12 Claims, 2 Drawing Sheets

(56) References Cited

OTHER PUBLICATIONS

Zuowei Xie et al., New Weakly Coordinating Anions: Useful Silver and Trityl Salt Reagents of Carhorane Anions, *J. Am. Chem. Soc.* 1994, 116, 1907-1913 (Abstract and First Page).

Zuowei Xie et al., Approaching the Silylium ($R_3Si+$) Ion: 'Trends with Hexahalo (Cl, Br, I) Carboranes as Counterions, *J. Am. Chem. Soc.* 1996, 118, 2922-2928 (Abstract).

Benjamin T. King et al., The Sixteen $CB_{11}H_nMe_{12-n}$ Anions with Fivefold Substitution Symmetry: Anodic Oxidation and Electronic Structure, *J. Am. Chem. Soc.* 2007, 129, 12960-12980.

Christopher A. Reed, Carboranes: A New Class of Weakly Coordinating Anions for Strong Electrophiles, Oxidants, and Superacids, Acc. Chem. Res. 31, 133-139 (1998).

T. J. Richardson, et. al., Redox shuttle additives for overcharge protection in lithium batteries, Department of Energy (Nov. 11, 1999).

Rupich, et al., Characterization of Chloroclosoborane Acids as Electrolytes for Acid Fuel Cells, J. Electrochem. Soc., vol. 132, Issue 1, 119-122 (1985).

Doo-Yeon Lee, Redox shuttle additives for chemical overcharge protection in lithium ion batteries, Korean J. Chem. Eng., 19(4), 645-652 (2002).

* cited by examiner

REDOX SHUTTLE FOR HIGH VOLTAGE LITHIUM BATTERY

CROSS REFERENCE TO RELATED APPLICATION

This application claims priority from U.S. Provisional Patent Application Ser. No. 61/467,687, filed Mar. 25, 2011, the disclosure of which is hereby expressly incorporated by reference herein in its entirety.

FIELD OF THE DISCLOSURE

This disclosure relates to redox shuttles for batteries including high voltage batteries, and more particularly to redox shuttles for high voltage lithium ion (Li-ion) batteries.

BACKGROUND OF THE DISCLOSURE

Redox shuttles are designed to prevent overcharge of a battery by shuttling, through the electrolyte, charge forced by an external circuit through a Li-ion cell without forcing intercalation/deintercalation of lithium in the electrodes of the cell. The redox shuttle is an electrolyte additive with a defined redox potential that is oxidized at the positive electrode. The oxidized species then travels back to the anode by diffusion where it is reduced back to the original species for another redox cycle. During normal operation of the cell, the redox potential of the redox shuttle is not reached and the redox shuttle molecule or ion stays inactive.

Redox shuttles have not achieved commercial use with Li-ion batteries, because current redox shuttles do not achieve the needed voltage and stability to function in high voltage Li-ion batteries, which are typically charged to 4.0 V or higher. Current redox shuttles also do not have sufficient life under overcharge conditions.

One known redox shuttle includes a closo-borate anion having the formula $Li_2B_{12}F_{12-x}H_x$, which is an ionic lithium salt. The chemical structure of the 2-anion is such that the boron atoms form a 12-vertex icosahedron cage with a fluorine or hydrogen atom bonded to each boron atom around the cage. These compounds show high solubility in typical Li-ion battery electrolytes and are electrochemically reversible, but some of the redox potentials, which are partially determined by the degree of substitution on the boron atom, are too high to be used in a 4.2 V cell and have limited life during overcharge. $Li_2B_{12}F_{12}$, for example, may have a redox potential greater than about 4.6 V, which may be too high to be used in a 4.2 V cell. $Li_2B_{12}F_9H_3$, as another example, may have a lower redox potential than $Li_2B_{12}F_{12}$, but may be more unstable, more difficult to synthesize, and more expensive than $Li_2B_{12}F_{12}$. See, for example, U.S. Pat. No. 7,785,740 to Amine et al.

Prior literature (King, B. T. et. al. *J. Am. Chem. Soc.* Vol. 129, No. 43, 2007, 12960) has shown that closo-monocarborate anions may be reversibly oxidized and reduced by electrochemical and chemical means. However, in the context of Li-ion batteries, such carborane cage anions have been described as being fluorinated (e.g., $RCB_{11}F_{11}$). See again, U.S. Pat. No. 7,785,740 to Amine et al. Due to the high electronegativity of fluorine atoms, the fluorine-substituted closo-monocarborate anion would be expected to have a redox potential that is too high to be used in a 4.2 V cell, like the above-described fluorine-substituted closo-borate anion. In fact, because the closo-monocarborate anion has a 1-charge, the closo-monocarborate anion would be expected to have an even higher redox potential than the above-described closo-borate anion, which has a 2-charge.

The solubility of the oxidized and reduced forms of the redox shuttle is also important. A larger concentration of redox shuttle with a given diffusion constant in a given electrolyte will result in an increased current that can be shuttled. Both the oxidized and reduced forms of the redox shuttle need to have good solubility since both must diffuse though the electrolyte.

Other technologies that may be used to prevent Li-ion cell and battery overcharge include external voltage regulation and inactivation agents that are added to the electrolyte of the cell and that cause the battery to shut down if the cell is overcharged. External voltage regulation has the disadvantage that it adds to the cost and weight of the battery system while inactivation agents permanently disable the cell.

SUMMARY

A redox shuttle compound is provided to prevent overcharge of batteries and/or shuttle current in batteries including high voltage batteries, such as high voltage lithium ion (Li-ion) batteries. An exemplary redox shuttle includes a methylated closo-monocarborate anion.

According to an embodiment of the present disclosure, an electrochemical cell is provided including an anode, a cathode, and a non-aqueous electrolyte in communication with the anode and the cathode. The electrolyte includes a redox shuttle compound that provides overcharge protection to the cell, the redox shuttle compound corresponding to Formula I:

$$M^+X^- \qquad (I)$$

wherein:
M is an alkali metal; and
$X^-$ is a closo-monocarborate anion of the formula $R^1CB_{11}R^2R^3R^4R^5R^6R^7R^8R^9R^{10}R^{11}R^{12}$, where a plurality of members selected from $R^{1-12}$ each comprises a C1-C4 alkyl.

According to another embodiment of the present disclosure, an electrochemical cell is provided including an anode, a cathode, and a non-aqueous electrolyte in communication with the anode and the cathode, the electrolyte including at least one polar solvent and a redox shuttle compound that provides overcharge protection to the cell. The redox shuttle compound corresponds to Formula I above, wherein:
M is an alkali metal; and
$X^-$ is a closo-monocarborate anion of the formula $R^1CB_{11}R^2R^3R^4R^5R^6R^7R^8R^9R^{10}R^{11}R^{12}$, where $R^1$ comprises a polar functional group selected from a substituted or unsubstituted acetyl or other ketone, a cyano functional group, a nitro functional group, $NR'_2$ and $OR'$ where R' is a C1-C4 alkyl, $Si(R'')_3$ where R'' is a C1-C4 alkyl, and a polyether or oligoether functional group, the redox shuttle compound being soluble in the at least one polar solvent of the electrolyte.

According to yet another embodiment of the present disclosure, an electrolyte is provided for use in an electrochemical cell having an anode and a cathode. The electrolyte includes at least one polar solvent and a redox shuttle compound in the at least one polar solvent that provides overcharge protection to the cell. The redox shuttle compound corresponds to Formula I above, wherein:
M is an alkali metal; and
$X^-$ is a closo-monocarborate anion of the formula $R^1CB_{11}R^2R^3R^4R^5R^6R^7R^8R^9R^{10}R^{11}R^{12}$, where:

R$^1$ comprises a polar functional group, the redox shuttle compound being soluble in the polar solvent of the electrolyte, and a plurality of members selected from R$^{2-12}$ each comprises a C1-C4 alkyl.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

This disclosure relates to prevention of the overcharge of Li-ion cells by providing an internal mechanism inside the cell that limits the cell voltage.

Figure 1:
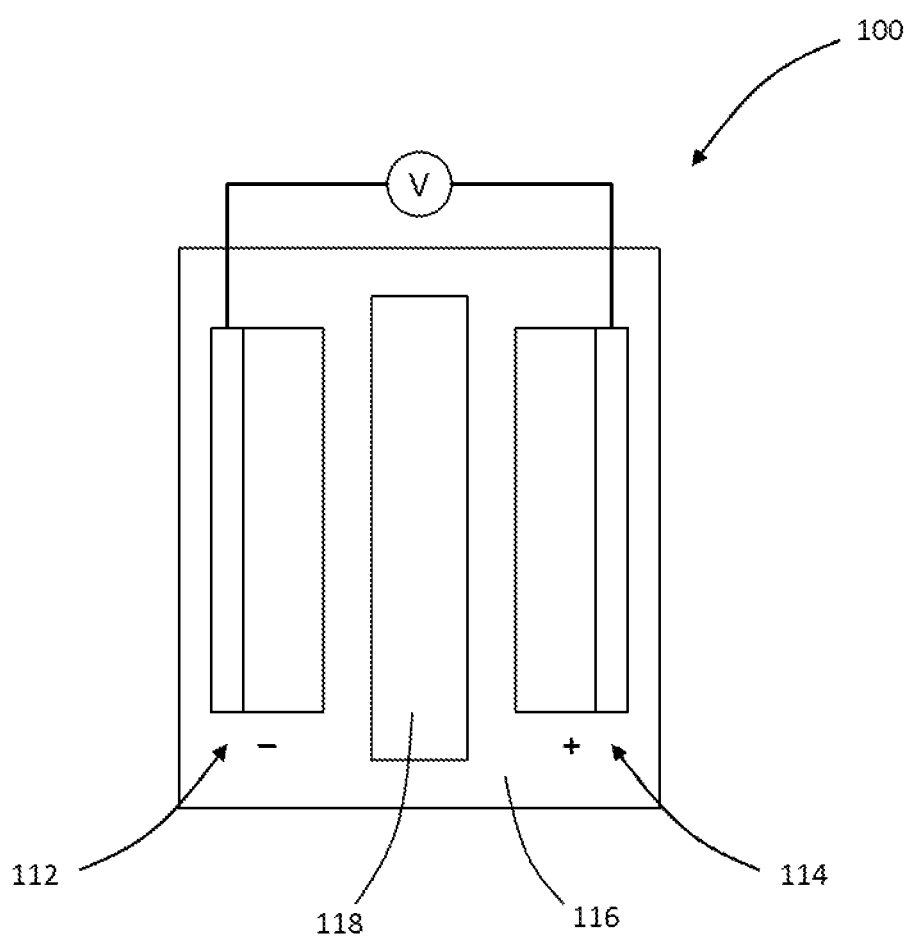
FIG. 1 is a schematic view of a lithium-ion cell.

An exemplary Li-ion cell 100 is illustrated schematically in FIG. 1. Cell 100 may be used in secondary (rechargeable) or non-rechargeable batteries. Cell 100 may be used in a rechargeable battery of a hybrid vehicle or an electric vehicle, for example, serving as a power source that drives an electric motor of the vehicle. Cell 100 may also store and provide energy to other devices which receive power from batteries, such as the stationary energy storage market. Exemplary applications for the stationary energy storage market include providing power to a power grid, providing power as an uninterrupted power supply, and other loads which may utilize a stationary power source. In one embodiment, cell 100 may be implemented to provide an uninterrupted power supply for computing devices and other equipment in data centers. A controller of the data center or other load may switch from a main power source to an energy storage system of the present disclosure based on one or more characteristics of the power being received from the main power source or a lack of sufficient power from the main power source.

Cell 100 of FIG. 1 includes an anode (or negative electrode) 112 and a cathode (or positive electrode) 114, at least one of which has lithium incorporated into it. Anode 112 of cell 100 is capable of reversibly incorporating lithium ions. Examples of suitable materials for anode 112 include, for example, lithium metal, lithium alloys, lithium-carbon (e.g., hard carbon, soft carbon) or lithium-graphite intercalation compounds, silicon and lithium metal oxide intercalation compounds such as Li$_4$Ti$_5$O$_{12}$(LTO). Cathode 114 of cell 100 is also capable of reversibly incorporating lithium ions. Examples of suitable materials for cathode 114 include transition metal oxides, such as LiNi$_{0.8}$Co$_{0.2}$O$_2$, LiCoO$_2$ (LCO), LiNiO$_2$, LiMn$_2$O$_4$, LiMnO$_2$, and LiNi$_{0.33}$Mn$_{0.33}$Co$_{0.33}$O$_2$, LiNi$_{0.8}$Co$_{0.15}$Al$_{0.05}$O$_2$, and combinations thereof.

In assembling the cell 100 of the disclosure, the cathode 114 is typically fabricated by depositing a slurry of the cathode material, an electrically conductive inert material, a binder, and a liquid carrier on a cathode current collector, and then evaporating the carrier to leave a coherent mass in electrical contact with the current collector.

In assembling the cell 100 of the disclosure, the anode 112 can similarly be fabricated by depositing slurry of carbonaceous anode material, an electrically conductive inert material, a binder, and a liquid carrier on an anode current collector, and then evaporating the carrier to leave a coherent mass in electrical contact with the current collector.

Cell 100 of FIG. 1 also includes an electrolyte solution 116 in communication with anode 112 and cathode 114. The electrolyte solution 116 includes a redox shuttle, as discussed further below. Suitable electrolyte solvents include, for example, non-aqueous liquid polar solvents, such as cyclic carbonates (e.g. propylene carbonate (PC), ethylene carbonate (EC)), alkyl carbonates, dialkyl carbonates (e.g., dimethyl carbonate (DMC), diethyl carbonate (DEC), ethyl methyl carbonate (EMC)), cyclic ethers, cyclic esters, and mixtures thereof. Other suitable electrolyte solvents include lactones, formates, esters, sulfones, nitrites, and oxazolidinones.

The electrolyte solution 116 may or may not also contain another lithium salt dissolved in the electrolyte solvent. These other salts or salt combinations may be added to increase the conductivity of the electrolyte solution 116. Suitable salts include but are not limited to: lithium hexafluorophosphate, lithium bis(oxalate)borate, lithium difluorooxalatoborate, and lithium tetrafluoroborate, for example.

Cell 100 of FIG. 1 further includes a porous polyethylene separator 118. The cathode assembly 114 is combined with the anode assembly 112 with the porous separator 118 sandwiched between these two assemblies. The preferred way of constructing high voltage rechargeable cells is to make them with the cathode 114 in the discharged state because the material is stable in air. In a Li-ion cell 100 employing a carbonaceous anode material, this material is also in a discharged state during cell assembly. In FIG. 1, anode 112 and cathode 114 are plate-shaped structures that are stacked or layered together. Several of these layers may be assembled together to form a prismatic cell. It is also within the scope of the present disclosure that the layered assembly may be wound around a metal post which may serve as terminal for the cell 100. After assembly of the electrode materials in the cell, the electrolyte solution in which the salt and redox shuttle is dissolved is added. The cell container is then capped or sealed.

As discussed above, cell 100 of the present disclosure includes a redox shuttle compound dissolved in the electrolyte 116 that limits the cell voltage and prevents overcharging. One or more redox shuttles may be used in the electrolyte 116. Due to the presence of the redox shuttle compound, upon reaching a certain voltage, the applied external current is shunted between the cathode 114 and anode 112 through the electrolyte 116 without forcing intercalation/deintercalation of lithium in the electrodes 112, 114 of the cell 100. This prevents the electrodes 112, 114 in the cell 100 from reaching overcharged states that are unsafe and damage the cell 100.

The redox shuttle is an electrolyte additive with a defined redox potential that is oxidized at the cathode 114 and reduced at the anode 112. Once oxidized at the cathode 114, the oxidized species travels back to the anode 112 where it is reduced back to the original species for another redox cycle. During normal operation of the cell 100, the redox potential of the redox shuttle is not reached and the redox shuttle molecule or ion stays inactive in its reduced form. The redox shuttle compound must therefore be soluble in the electrolyte 116 in both the oxidized and reduced forms. In one embodiment, cell 100 utilizes a cathode 114, which when fully charged, has a voltage of greater than 4.0 V vs. lithium, such as about 4.1 to 4.2 V vs. lithium.

The concentration of the redox shuttle compound in the electrolyte 116 can vary. The concentration of the redox shuttle should be as high as possible to maximize the shuttle current that can be carried between the electrodes 112, 114 without affecting the performance of the cell 100 during normal operation and under overcharge conditions, so as to maximize the rate that overcharge current can pass. In certain embodiments, concentration typically ranges from about 0.8 to 1.4 M in total $Li^+$ cation content.

The redox shuttle dissolved in typical Li-ion electrolyte solvents is expected to provide ionic conductivity. Therefore, the redox shuttle may be used alone or with another salt in the electrolyte 116, as discussed above, to carry $Li^+$ ions between the anode 112 and cathode 114. Because the redox shuttle is expected to contribute to the overall conductivity of the electrolyte 116, a smaller amount of the electrolyte salt may be needed.

The redox shuttle of the present disclosure, in its unoxidized form, may comprise a salt with Formula I:

$$M^+X^- \qquad (I)$$

wherein:

M is an alkali metal, such as lithium; and $X^-$ is a closo-monocarborate anion of the formula $R^1CB_{11}R^2R^3R^4R^5R^6R^7R^8R^9R^{10}R^{11}R^{12}$, where $R^{1-12}$ may each be hydrogen, a halogen selected from F, Cl, Br, and I, an organic moiety that is a C1-C4 substituted or unsubstituted alkyl, a substituted or unsubstituted aryl, acetyl or other ketone, a cyano functional group, a nitro functional group, $NR'_2$ or $OR'$ where R' is a C1-C4 alkyl, $Si(R'')_3$ where R'' is a C1-C4 alkyl, and a polyether or oligoether functional group such as 2-methoxyethoxy.

Examples of the redox shuttle are lithium salts of $CB_{11}(CH_3)_{12}^-$, 1-acetyl-2,3,4,5,6,7,8,9,10,11,12-undecamethylcarba-closo-dodecaborate, 1-ethanoate-2,3,4,5,6,7,8,9,10,11,12-undecamethylcarba-closo-dodecaborate, 1-cyano-2,3,4,5,6,7,8,9,10,11,12-undecamethylcarba-closo-dodecaborate, and 1-acetyl-2,3,4,5,6,7,8,9,10,11-decamethylcarba-closo-dodecaborate.

1. Redox Potential

According to an exemplary embodiment of the present disclosure, the redox shuttle has a redox potential that is suitable for use in a "4 V" cell, and more specifically a "4 V" Li-ion cell.

Ideally, the counter ion M for the anion X of the redox shuttle of Formula I will be the lithium cation ($Li^{+1}$). The redox potential of the anion X may be about 0.1 to 0.4 V higher than the maximum cathode potential, or about 4.3 to 4.6 V vs. Li for most "4 V" cathode materials that are typically charged to about 4.1 to 4.2 V vs. Li. The anion X of the redox shuttle will not be appreciably oxidized to a neutral species unless it comes into contact with the cathode 114 having a potential equal to or exceeding the redox potential of the anion X. Redox shuttles that have a redox potential that is too low (i.e., too close to the maximum potential of the cathode 114 under normal operating conditions) will cause the cell 100 to have a high self-discharge rate. On the other hand, redox shuttles that have a redox potential that is too high (i.e., too far from the maximum potential of the cathode 114 under normal operating conditions) will not provide sufficient overcharge protection.

Figure 2:
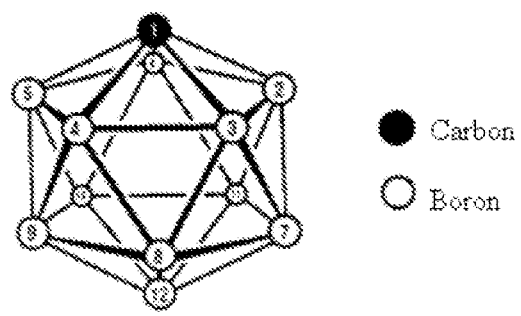
FIG. 2 is a schematic view of a closo-monocarborate compound of the present disclosure.

The closo-monocarborate compounds of the present disclosure have an appropriate redox potential and high stability even in the oxidized form. As shown in FIG. 2, these closo-monocarborate compounds are characterized by having a 12-vertex icosahedrons cage with 11 boron and 1 carbon atom forming the cage of the 1-anion X. The numbering scheme for the carbon and boron atom vertices is shown in FIG. 2 with the numbering beginning at the carbon atom and proceeding around the adjacent ring of boron atoms to the second ring of boron atoms furthest away from the carbon atom and ending with the boron atom opposite the carbon atom on the cage. Each boron and carbon atom has one substituent that may be an alkyl, halogen, hydrogen, or an organic functional group with a carbonyl, ether, nitro, cyano, or other polar functional group present.

An exemplary redox shuttle has a plurality of alkyl-substituted boron atoms. For example, the redox shuttle may have as few 6, 7, or 8 alkyl-substituted boron atoms and as many as 9, 10, or 11 alkyl-substituted boron atoms. Compared to fluorine substituents, the alkyl substituents of the present disclosure would be less electronegative. Additionally, the alkyl substituents of the present disclosure would provide more steric bulk than fluorine substituents, which may protect the oxidized form of the redox shuttle from chemical decomposition by preventing the radical on the cage from reacting or dimerizing with another oxidized redox shuttle. Methyl substitution is primarily described herein, but ethyl substitution on the carborane cage has been performed previously and would presumably have similar electrochemisty.

Examples in the existing literature of electrochemically reversible carborane cages include: 2,3,4,5,6,7,8,9,10,11-decamethylcarbacloso-dodecaborate (which has 10 methyl-substituted boron atoms), 2,3,4,5,6,7,8,9,10,11,12-undecamethylcarba-closo-dodecaborate (which has 11 methyl-substituted boron atoms), 1,7,8,9,10,11,12-heptamethylcarba-closo-dodecaborate (which has 6 methyl-substituted boron atoms and 1 methyl-substituted carbon atom), 1,2,3,4,5,6,7,8,9,10,11-undecamethylcarba-closo-dodecaborate (which has 10 methyl-substituted boron atoms and 1 methyl-substituted carbon atom), and dodecamethyl-carba-closo-dodecaborate (which has 11 methyl-substituted boron atoms and 1 methyl-substituted carbon atom).

The fully-methylated dodecamethylcarba-closo-dodecaborate ($CB_{11}(CH_3)_{12}^-$) anion, in particular, and its oxidized form have been studied in detail (King, et. al *J. Am. Chem. Soc.* 1996, 118, 3313-3314 and King et. al. *J. Am. Chem. Soc.* 1996, 118, 10902-10903). The redox potential of this anion has been electrochemically determined to be 1.16 V vs. ferrocene and is electrochemically reversible. The redox potential of ferrocene vs. lithium has been reported as being 3.23 V, so the redox potential of $CB_{11}(CH_3)_{12}^-$ should be about 4.39 V vs. lithium. Because the redox potential of the shuttle may be about 0.1 to 0.4 V higher than that of the highest cathode potential reached under normal operating conditions of the cell, as discussed above, the $CB_{11}(CH_3)_{12}^-$ anion should be suitable for use as a redox shuttle in cells that operate at about 4.1, 4.2, or 4.3 V, for example.

Under normal operating conditions, the $CB_{11}(CH_3)_{12}^-$ anion is not oxidized. However, upon reaching its redox potential under overcharge conditions, the anion is oxidized at the cathode 114 to its neutral radical. This radical has been chemically isolated in a 74% yield which implies that it has high stability. This stability is expected to be an improvement over that of other known redox shuttles, which are usually radicals that are not very stable, and this instability can ultimately limit cycle life under overcharge conditions. After oxidation, the radical will travel back to the anode 112 where it will be reduced to the original anion for another redox cycle. The oxidized species was soluble in non-polar media including pentane, carbon tetrachloride, and diethyl ether.

The high stability of the $CB_{11}(CH_3)_{12}^-$ anion has been attributed to the steric effects of the methyl groups. It is therefore desirable that the carborane cage has a high degree of substitution, especially with respect to the atoms in positions 1-6 of the carborane cage ($R^1$-$R^6$). Also, there may be no adjacent B—H or B-halogen vertices in positions 7-12 of the carborane cage ($R^7$-$R^{12}$). Thus, with respect to Formula I above, the following set of conditions may apply when $R^7$-$R^{12}$=H or halogen:

If $R^7$=H or halogen, then $R^8$, $R^{11}$, $R^{12}$≠H or halogen,
If $R^8$=H or halogen, then $R^7$, $R^9$, $R^{12}$≠H or halogen,
If $R^9$=H or halogen, then: $R^8$, $R^{10}$, $R^{12}$≠H or halogen,
If $R^{10}$=H or halogen, then $R^9$, $R^{11}$, $R^{12}$≠H or halogen,
If $R^{11}$=H or halogen, then $R^{10}$, $R^7$, $R^{12}$≠H or halogen, and
If $R^{12}$=H or halogen, then $R^7$, $R^8$, $R^9$, $R^{10}$, $R^{11}$≠H or halogen.

The potential of the redox shuttle can be fine-tuned by varying the organic functional groups on the boron atoms or carbon atom of the carborane cage, depending on the electron withdrawing or donating properties of the functional group. In addition to impacting the redox potential of the anion, these functional groups may also impact the diffusion coefficient and stability of the anion. For example, electron-withdrawing substituents, such as acyl groups as in the acetyl group, may be substituted on the carbon atom of the fully-methylated 1,2,3,4,5,6,7,8,9,10,11,12-dodecamethylcarba-closo-dodecaborate anion to form 1-acetyl-2,3,4,5,6,7,8,9,10,11,12-undecamethylcarba-closo-dodecaborate anion and to increase the redox potential. By contrast, less electron-withdrawing substituents, such as alkoxy groups, may be substituted on the carbon atom to form 1-R-2,3,4,5,6,7,8,9,10,11,12-undecamethylcarba-closo-dodecaborate anion (where R=$CH_3OCH_2CH_2O$) and to lower the redox potential to about the same as the fully-methylated 1,2,3,4,5,6,7,8,9,10,11,12-dodecamethylcarba-closo-dodecaborate anion.

2. Solubility

According to another exemplary embodiment of the present disclosure, both the reduced and the oxidized (radical) forms of the redox shuttle are soluble in a polar Li-ion electrolyte 116, such as a mixture of ethylene carbonate and diethyl carbonate.

The cesium salt of the $CB_{11}(CH_3)_{12}^-$ anion was previously reported to have high solubility in acetonitrile, a polar solvent. However, upon oxidation, the neutral $CB_{11}(CH_3)_{12}$ radical was extracted from acetonitrile into pentane, a nonpolar solvent. Also, ferrocene and its anion ferrocenium have good solubility in polar Li-ion battery electrolytes but decamethyl ferrocene and its anion decamethyl ferrocenium have poor solubility in such polar electrolytes. For these reasons, it is anticipated that the neutral $CB_{11}(CH_3)_{12}$ radical will have limited solubility in the polar Li-ion electrolyte 116.

An exemplary redox shuttle has at least one polar functional group to encourage solubility in the polar Li-ion electrolyte 116. The polar functional group may be more readily substituted onto the carbon atom of the carborane cage, but it is also within the scope of the present disclosure to substitute the polar functional group onto the boron atoms of the carborane cage. With reference to Formula I above, for example, where $R^1$ is bonded to the carbon atom, $R^1$ may include a substituted or unsubstituted acetyl or other ketone, a cyano functional group, a nitro functional group, $NR'_2$ or $OR'$ where R' is a C1-C4 alkyl, $Si(R'')_3$ where R'' is a C1-C4 alkyl, and a polyether or oligoether functional group such as 2-methoxyethoxy, for example. Replacing one or more of the methyl groups on the carborane cage with such a polar functional group should improve the solubility of the oxidized form of the redox shuttle.

The substituents on the carborane cage can be varied to adjust the solubility of the reduced and oxidized form of the redox shuttle. For example, a first redox shuttle compound with good solubility in a typical Li-ion battery electrolyte consisting of a 30:70 mixture of ethylene carbonate and diethylcarbonate with 1.0 M lithium hexafluorophosphate is anticipated to be lithium 1-acetyl-2,3,4,5,6,7,8,9,10,11,12-undecamethylcarba-closo-dodecaborate (where $R^1$=C(O)$CH_3$). Both the reduced and oxidized forms of this compound would be expected to exhibit high solubility in the electrolyte. A second redox shuttle compound with good solubility in a typical lithium ion battery electrolyte consisting of a 30:70 mixture of ethylene carbonate and diethylcarbonate with 1.0 M lithium hexafluorophosphate is anticipated to be lithium 1-$R^1$-2,3,4,5,6,7,8,9,10,11,12-undecamethylcarba-closo-dodecaborate (where $R^1$=$CH_3OCH_2CH_2O$). Both the reduced and oxidized forms of this compound would be expected to exhibit high solubility in the electrolyte.

Solubility may be determined by visual observation. A soluble redox shuttle may dissolve in the electrolyte 116 without forming a precipitate. An insoluble redox shuttle, by contrast, may precipitate out of the electrolyte 116 and may migrate to the anode 112 where it could be reduced. Solubility may also be evaluated in the oxidized state by first oxidizing the redox shuttle, such as by subjecting the redox shuttle to an acidic environment or by exposing the redox shuttle to $NO_2PF_6$, for example.

PROPHETIC EXAMPLES

1. Example 1

An electrochemical cell may be manufactured with a $LiNi_{0.33}Mn_{0.33}Co_{0.33}O_2$ cathode, a graphite anode, and a polyethylene separator. The electrolyte used in the cell may consist of 1 M lithium hexafluorophosphate dissolved in a 30:70 mixture of ethylene carbonate and diethyl carbonate. Following cell formation, if this cell were to be overcharged at the C/5 rate, the cell would be expected to reach a potential of about 4.9 V, which may be a safety limit set by software.

2. Example 2

An electrochemical cell may be manufactured with a $LiNi_{0.33}Mn_{0.33}Co_{0.33}O_2$ cathode, a graphite anode, and a polyethylene separator. The electrolyte used in the cell may consist of 1 M lithium hexafluorophosphate dissolved in a 30:70 mixture of ethylene carbonate and diethyl carbonate. Also dissolved in the electrolyte may be 0.2 M lithium 1-acetyl-2,3,4,5,6,7,8,9,10,11,12-undecamethylcarba-closo-dodecaborate. Following cell formation, if this cell were to be overcharged at the C/5 rate, the cell potential would be expected to be limited to 4.5 V for 5 cycles of 100% overcharge.

3. Example 3

An electrochemical cell may be manufactured with a $LiNi_{0.33}Mn_{0.33}Co_{0.33}O_2$ cathode, a graphite anode, and a polyethylene separator. The electrolyte used in the cell may consist of 1 M lithium hexafluorophosphate dissolved in a 30:70 mixture of ethylene carbonate and diethyl carbonate. Also dissolved in the electrolyte may be 0.2 M lithium 1-R-2,3,4,5,6,7,8,9,10,11,12-undecamethylcarba-closo-dodecaborate (R=$CH_3OCH_2CH_2O$). Following cell formation, if this cell were to be overcharged at the C/5 rate, the cell potential would be expected to be limited to 4.4 V for 5 cycles of 100% overcharge.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An electrolyte for use in an electrochemical cell having an anode and a cathode, the electrolyte comprising:
   at least one polar solvent; and
   a redox shuttle compound in the at least one polar solvent that provides shuttling of current in the cell, the redox shuttle compound corresponding to Formula I:

$$M^+X^- \qquad (I)$$

wherein:
   M is an alkali metal; and
   $X^-$ is a closo-monocarborate anion of the formula $R^1CB_{11}R^2R^3R^4R^5R^6R^7R^8R^9R^{10}R^{11}R^{12}$, where:
   $R^1$ is a polar functional group, the redox shuttle compound being soluble in the at least one polar solvent of the electrolyte, and
   a plurality of members selected from $R^{2-12}$ each comprises a C1-C4 alkyl.

2. The electrolyte of claim 1, wherein the polar functional group is selected from the group consisting of a substituted or unsubstituted acetyl or other ketone, a cyano functional group, a nitro functional group, $NR'_2$ and $OR'$ where R' is a C1-C4 alkyl, $Si(R'')_3$ where R'' is a C1-C4 alkyl, and a polyether or oligoether functional group.

3. The electrolyte of claim 1, wherein each remaining member of $R^{2-12}$ that does not comprise a C1-C4 alkyl comprises one of hydrogen and a halogen selected from F, Cl, Br, and I.

4. The electrolyte of claim 1, wherein each member of $R^{2-6}$ comprises a C1-C4 alkyl.

5. The electrolyte of claim 1, wherein 6 to 11 members of $R^{2-12}$ comprise a C1-C4 alkyl.

6. The electrolyte of claim 1, wherein $R^1$ comprises one of $C(O)CH_3$ and $CH_3OCH_2CH_2O$.

7. The electrolyte of claim 1, wherein, when at least one member of $R^{7-12}$=H or halogen, the following set of conditions apply:
   If $R^7$=H or halogen, then $R^8$, $R^{11}$, $R^{12} \neq$H or halogen,
   If $R^8$=H or halogen, then $R^7$, $R^9$, $R^{12} \neq$H or halogen,
   If $R^9$=H or halogen, then: $R^8$, $R^{10}$, $R^{12} \neq$H or halogen,
   If $R^{10}$=H or halogen, then $R^9$, $R^{11}$, $R^{12} \neq$H or halogen,
   If $R^{11}$=H or halogen, then $R^{10}$, $R^7$, $R^{12} \neq$H or halogen, and
   If $R^{12}$=H or halogen, then $R^7$, $R^8$, $R^9$, $R^{10}$, $R^{11} \neq$H or halogen.

8. The electrolyte of claim 1, wherein the redox shuttle comprises lithium 1-$R^1$-2,3,4,5,6,7,8,9,10,11,12-undecamethylcarba-closo-dodecaborate.

9. The electrolyte of claim 1, wherein M is lithium.

10. The electrolyte of claim 1, wherein the at least one polar solvent comprises one of ethylene carbonate and diethyl carbonate.

11. The electrolyte of claim 1, wherein each member of $R^{2-12}$ comprises one of a C1-C4 alkyl, hydrogen, and a halogen selected from F, Cl, Br, and I.

12. The electrolyte of claim 1, wherein the redox shuttle compound provides overcharge protection to the cell by shuttling current in the cell.

* * * * *